United States Patent [19]
Fisher et al.

[11] Patent Number: 5,576,906
[45] Date of Patent: Nov. 19, 1996

[54] SYNCHRONOUS DETECTION OF CONCURRENT SERVO BURSTS FOR FINE HEAD POSITION IN DISK DRIVE

[75] Inventors: Kevin D. Fisher, Palo Alto; Jim Fitzpatrick, Mountain View; Xiaodong Che, Sunnyvale, all of Calif.

[73] Assignee: Quantum Corporation, Milpitas, Calif.

[21] Appl. No.: 320,540

[22] Filed: Oct. 11, 1994

[51] Int. Cl.$^6$ ................................................ G11B 5/596
[52] U.S. Cl. ........................... 360/77.08; 360/46; 360/51
[58] Field of Search ........................... 360/77.08, 78.14, 360/48, 77.05, 77.02, 46, 51

[56] References Cited

U.S. PATENT DOCUMENTS

| | | |
|---|---|---|
| 4,032,984 | 6/1977 | Kaser et al. . |
| 4,101,942 | 7/1978 | Jacques . |
| 4,188,646 | 2/1980 | Sordello et al. . |
| 4,511,938 | 4/1985 | Betts ................................. 360/77.08 |
| 5,089,757 | 2/1992 | Wilson ........................... 360/77.08 X |
| 5,136,439 | 8/1992 | Westpfenning et al. ............. 360/77.08 |
| 5,170,299 | 12/1992 | Moon . |
| 5,241,309 | 8/1993 | Cideciyan et al. ...................... 341/59 |
| 5,255,131 | 10/1993 | Coker et al. . |
| 5,301,072 | 4/1994 | Wilson ........................... 360/77.08 X |
| 5,341,249 | 8/1994 | Abbott et al. .............................. 360/46 |
| 5,384,671 | 1/1995 | Fisher ........................................ 360/51 |
| 5,416,806 | 5/1995 | Coker et al. ........................... 360/32 X |
| 5,459,757 | 10/1995 | Minuhin et al. ......................... 375/376 |
| 5,517,146 | 5/1996 | Yamasaki ............................... 327/276 |

Primary Examiner—Aristotelis Psitos
Assistant Examiner—James L. Habermehl
Attorney, Agent, or Firm—David B. Harrison; Debra A. Chun

[57] ABSTRACT

Synchronous detection of fine position servo burst information with a data transducer having an electrical width not less than about two-thirds a width of a data track within a partial response maximum likelihood (PRML) data channel is disclosed. The servo burst information is recorded on a storage medium as a pair or series of fractional-track-width sinewave concurrent burst patterns and includes an on-track phase generating a position error signal which varies linearly with head displacement about track centerline and at least one off-track phase generating a position error signal which varies linearly with head displacement about a position related to track boundary. The method includes steps of reading the on-track phase and the off-track phase with a head to provide an analog signal stream, amplifying and low pass filtering the signal stream to normalize gain of the signal stream, synchronously quantizing the signal stream to provide synchronous digital burst samples, multiplying the synchronous digital burst samples during servo sampling intervals by a normalization factor generated by a correlation signal generator to provide normalized samples, integrating normalized samples originating during the on-track phase to provide an on-track position error signal, and integrating normalized samples originating during the off-track phase to provide an off-track position error signal. Circuitry implementing the method including a discrete matched filter is also disclosed.

25 Claims, 5 Drawing Sheets

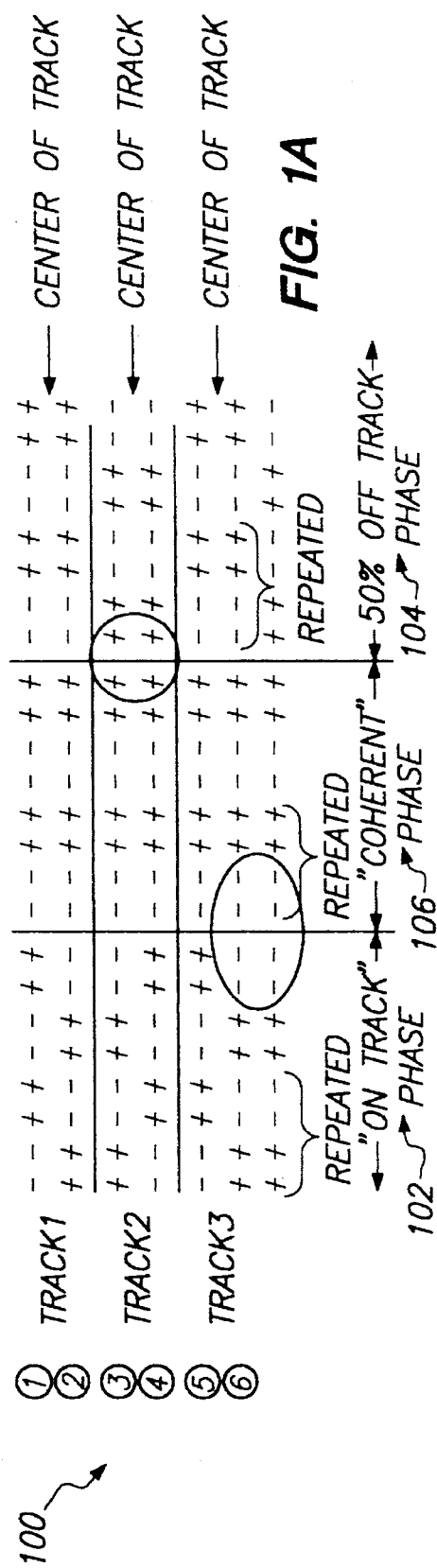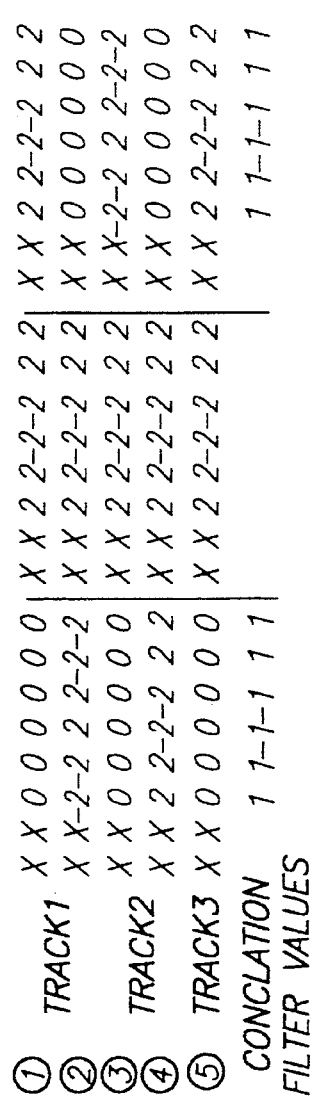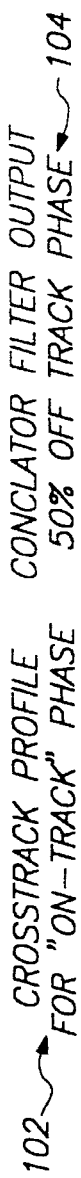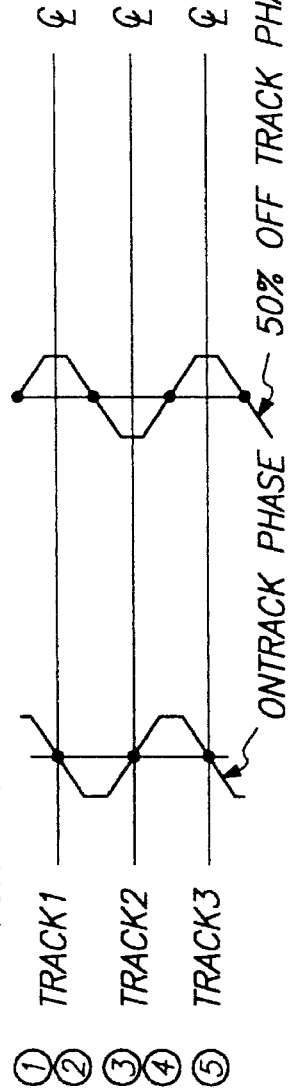

SYNCHRONOUS DETECTION OF CONCURRENT SERVO BURSTS FOR FINE HEAD POSITION IN DISK DRIVE

RELATED PATENT

This is related to commonly assigned U.S. patent application Ser. No. 08/174,895 filed on Dec. 23, 1993, entitled: "PRML SAMPLED DATA CHANNEL SYNCHRONOUS SERVO DETECTOR", now U.S. Pat. No. 5,384,671.

FIELD OF THE INVENTION

The present invention relates to positioning a data transducer head within a disk drive among a multiplicity of radial data track locations. More particularly, the present invention relates to a method and apparatus for synchronous detection of concurrently recorded servo bursts with a partial response, synchronous sampling data detection channel to provide fine head position information in a disk drive.

BACKGROUND OF THE INVENTION

Disk drives, particularly but not necessarily magnetic hard disk drives, record blocks of user data in concentric data tracks defined on major surfaces of a rotating rigid magnetic disk. A head structure supports and positions a data transducer head at each selected data track of an associated data storage surface in order to carry out reading or writing operations. In order to seek to, and then follow, each selected data track, the head positioning structure must perform head tracking operations, typically by using a form of servo control loop. Most prevalently, servo loops derive head position information from servo sectors which are interspersed or "embedded" within the data tracks. As each servo sector is encountered, user data transfer operations are suspended, and the head then senses prerecorded patterns of magnetic flux transitions which may include a unique servo address mark pattern to confirm that the head is reading from the servo sector, a coarse track number which is typically Gray coded, and fine position information which serves as a head position vernier within each track.

Within disk drives having a multiplicity of concentric data tracks defined on a rotating magnetic storage surface, head tracking has conventionally been carried out by asynchronously detecting Gray code track number information recorded within embedded servo sectors in order to provide coarse head position information to a head position servo loop. The servo control loop employed the coarse head position information, particularly during track seeking operations to control head trajectory from a departure track to a destination track. Once the destination track was reached, further information, known as "fine information" was needed to provide fine positional adjustments to the head structure, to be sure that the head was precisely following a centerline of the destination track.

In prior peak detection recording channels, the fine head position information has been embedded within the servo sectors in generally two different ways. One method employs a dibit, tribit or quadrabit pattern in which aligned flux transitions recorded in half-track-width patterns are summed and differenced within the magnetic data head structure. A discussion of the synchronous bit fine servo approach is provided in U.S. Pat. No. 4,101,942 to Jacques entitled: "Track Following Servo System and Track Following Code". Another approach in which between-track positions are capable of being resolved is given in U.S. Pat. No. 4,032,984 to Kaser et al., entitled: "Transducer Positioning System for Providing Both Coarse and Fine Positioning". One drawback of these prior approaches was that they were particularly susceptible to noise interfering with the single or few flux transitions providing the fine position information. Another drawback was that they employed asynchronous peak detection techniques which required that the pulses carrying the head position information be spaced sufficiently far apart so as to eliminate any possibility of intersymbol interference from adjacent pulses, and the resultant servo patterns required a considerable space within the servo sector format. Finally, even though some off-track position resolving capability existed, as described in the referenced Kaser et al. patent, the off-track signal was highly transitional and marginal, and was not capable of providing a robust, reliable position value.

Another prior peak detection servo pattern recorded in embedded servo sectors has been the plural burst pattern. In this approach, at least two (A and B) servo bursts are recorded in a radially offset, circumferentially staggered arrangement within each servo sector. These patterns were sequentially read by the data transducer head, and resultant relative amplitudes were sampled, peak detected, integrated and then passed into a servo data channel which asynchronously filtered the e.g. two, three or four separate and sequentially read sine wave burst fields (herein the "A", "B" and "C" bursts) using analog techniques. A position error signal (PES) was derived by calculating the difference in playback amplitudes of a selected pair of the available bursts. Since each of the selected burst pairs is offset in radial position from the other burst pair, when the head is on-track, equal relative burst amplitudes are read from each of two bursts, e.g. the A and C bursts. For thin film read heads, equal amplitudes are read when approximately one half of the head is over each burst.

In one prior example, when the head is not close to the track centerline, as during track settling following a seeking operation, the head makes use of a third or B burst to obtain an accurate measurement of the off-track distance. For example, in one preferred pattern, depicted and described in commonly assigned U.S. Pat. No. 5,170,299 to Moon, entitled: "Edge Servo for Disk Drive Head Positioner", burst amplitudes from bursts B and C will be equal when the head is reading exactly ¼ track width off track centerline. The disclosure of U.S. Pat. No. 5,170,299 is hereby incorporated by reference.

There are several drawbacks stemming from the prior approach. One drawback is that the three servo bursts, A, B and C, and the gaps separating them require considerable area within each servo sector, thereby increasing the servo overhead and reducing the amount of user data that can otherwise be recorded on the storage surface.

Another drawback is the requirement for separate analog circuitry for servo as in the case of a partial response, maximum likelihood ("PRML") read channel. While the digital peak detection process set forth in commonly assigned U.S. Pat. No. 5,321,559 to Nguyen et al., entitled: "Detection of Embedded Servo Sector Data with PRML Channel in Disk Drive", improved somewhat upon prior approaches by using the channel A/D for conversion of peak values, a need remained for a separate analog peak detection path, a path control and three burst sample and hold circuits. These added circuits and complexities have added cost within the disk drive system. Also, the prior approach used the conventional A, B, and C burst arrangement described above which is not particularly efficient or compact in terms of disk storage space. The disclosure of U.S. Pat. No. 5,321,559 is hereby incorporated by reference. A different asynchronous servo address mark detection method was described in U.S. Pat. No. 5,255,131 to Coker et al., entitled: "Asynchronous Servo Identification/Address Mark Detection for PRML Disk Drive System".

Synchronous servo detection methods within synchronous user data detection channels such as PRML hold the promise of increased burst accuracy as well as more efficient embedded servo sector patterns. In addition, by eliminating separate analog burst sampling and detection circuitry including in some cases a separate A/D converter for quantizing servo bursts, added cost can be reduced. Also, by using synchronous servo detection, the burst fields can be made more compact, thereby increasing the storage area available for user data.

One known method for performing synchronous servo detection is by employing the PRML read channel. A slightly modified version of data read mode can be used to detect servo Gray code and obtain the A, B, and/or C burst information, as explained in the related, commonly assigned, copending Fisher U.S. patent application Ser. No. 08/174,895 filed on Dec. 23, 1993, entitled: "PRML Sampled Data Channel Synchronous Servo Detector", now U.S. Pat. No. 5,384,671, the disclosure thereof being incorporated herein by reference. In this prior approach, the three burst servo scheme (or a four burst scheme for MR read heads) was retained. The servo burst sinewave values read by the head were low pass filtered, then digitized by the read channel A/D converter and finally accumulated. Due to the unpredictability of the burst amplitude at any given time (burst values are acquired to ascertain track position), PRML timing and gain loops were not adapted during measurement of the A, B and C burst relative amplitudes. It was thus assumed in this prior approach that the timing and gain loops would "coast" over the servo burst regions, or that additional synchronization fields would be inserted between the bursts to enable resynchronization of the timing and gain loops thereby adding to the servo overhead on the disk storage surface. Thus, this earlier solution was less than optimal in performance and continued to be wasteful in disk data storage area. Even though three distinct bursts were recorded in each servo sector, only two different values were of interest to the servo head position circuitry at any given time: the on-track position error signal A–C, and the off-track position error signal B–C.

Thus, a hitherto unsolved need has remained for a more compact and efficient servo burst pattern from which position error signals may be detected with synchronous sampling techniques in a more efficient manner than before.

SUMMARY OF THE INVENTION WITH OBJECTS

A general object of the present invention is to enable direct synchronous detection of fine head position signals recorded at a frequency otherwise resulting in intersymbol interference in a manner overcoming limitations, drawbacks and disadvantages of the prior art.

Another object of the present invention is to provide a more efficient and compact servo burst pattern adapted for inclusion within an embedded servo sector and adapted for synchronous detection with a sampling data detection channel, such as a PRML channel.

Another object of the present invention is to provide an embedded servo burst pattern which includes timing and gain loop information to enable updating of timing and gain loops of a sampling data detection channel in a manner overcoming limitations and drawbacks of the prior art approaches.

Another object of the present invention enabling synchronous servo burst detection is to reproduce phase coherent embedded servo information without loss of phase lock/gain lock synchronism with adjacently recorded embedded servo data.

Another object of the present invention is to provide a new servo burst pattern for an embedded servo sector which eliminates the need for any DC erase gaps between successive burst fields.

Another object of the present invention is to provide a shortened and more efficient servo burst pattern which is particularly suited to detection within a partial response, maximum likelihood synchronous detection channel.

A further object of the present invention is to provide a method and apparatus for synchronous servo burst detection usable with either conventional thin film inductive or magneto-resistive read elements included within a hard disk drive sampling data detection channel.

One more object of the present invention is to employ a discrete, gated matched filter within a synchronous servo burst detector for detecting head fine position from embedded servo burst information.

A further object of the present invention is to provide a synchronous servo detection method which includes a single stream of data divided into three distinct phases: an on-track phase, at least one off-track phase, and a coherent phase. These phases may be written only once within the servo sector, or they may be repeated as desired or required by a particular servo loop. A plurality of off-track phases may be provided for use with narrow-read-width magneto-resistive read elements.

In accordance with one facet of the present invention, a method enables synchronous detection of fine position servo concurrent burst information with a data transducer having an electrical width not less than about two-thirds a width of a data track within a PRML data channel. The servo burst information is recorded as e.g. a ¼T sinewave burst pattern within each one of a multiplicity of concentric data tracks of a storage disk, the servo concurrent burst pattern being phase coherent with one or more other servo data fields recorded in an embedded servo sector, the fine position servo concurrent burst information including an on-track phase generating a position error signal which is linear about track centerline and an off-track phase generating a position error signal which is linear about track boundary. The new method comprises the steps of:

reading the on-track phase and the off-track phase with a head to provide a fine position analog signal, amplifying and low pass filtering the signal, to normalize gain, synchronously quantizing the signal stream to provide synchronous digital burst samples, and passing the synchronous digital burst samples through a discrete gated matched filter structure including the steps of:

multiplying the synchronous digital burst samples during servo sampling intervals by a normalization factor generated by a correlation signal generator to provide normalized samples, integrating normalized samples originating during the on-track phase to provide an on-track position error signal, and integrating normalized samples originating during the off-track phase to provide an off-track position error signal.

In accordance with another facet of the present invention, a synchronous servo burst detector detects a phase-coherent servo burst pattern for a head position servo loop for controlling radial position of a data transducer head relative to a moving media defining a multiplicity of adjacent data storage tracks within a partial response, maximum likelihood recording and playback channel. The pattern is recorded on the media in one-half track widths and includes in a sequence an on-track portion generating a position error signal which is linear about a centerline of each track, and an off-track portion generating a position error signal which is linear about a boundary between adjacent tracks. The new detector comprises:

the transducer head for reading the servo burst pattern as an analog electrical signal stream, an analog read channel for amplifying the analog electrical signal stream, a low pass filter for low pass filtering the analog electrical signal stream, an analog to digital converter for synchronously sampling the filtered analog electrical signal stream and for putting out synchronous raw data samples, and a discrete gated matched filter structure comprising:

a correlation signal generator for generating a sequence of synchronous digital correlation values, a multiplier for multiplying each synchronous raw data sample by a corresponding digital correlation value to produce a normalized quantization sample, and a digital integrator connected to integrate a sequence of normalized quantization samples obtained from the on-track portion to provide an on-track position error signal to the head positioner servo loop, and connected to integrate a sequence of the normalized quantization samples obtained from the off-track portion to provide an off-track position error signal to the head positioner servo loop.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 1A represents an enlarged, lineal diagrammatic depiction of a magnetization pattern for one servo sector continuous PES field in accordance with aspects of the present invention. FIG. 1B represents PR4 synchronous sample values derived from the FIG. 1A pattern at known radial sampling positions of the head. FIG. 1C represents a graph of cross-track position profiles put out by a FIG. 3 correlator-integrator (discrete gated matched filter) circuit, showing on-track and 50% off-track phase signals as a function of head-to-track position.

DETAILED DESCRIPTION OF A PREFERRED EMBODIMENT

The present invention improves upon the prior art approaches for recovering fine or vernier head position information from relative amplitudes of radially offset, circumferentially sequential servo burst patterns e.g. of constant frequency. The present improvement may be realized in several ways. Essentially, a burst field area 100 within each embedded servo sector 17 of a data storage disk 16 is coherently recorded (by conventional coherent-phase servo writing techniques) in one half track width radial bands or track increments, as shown in FIG. 1A.

Figure 2:
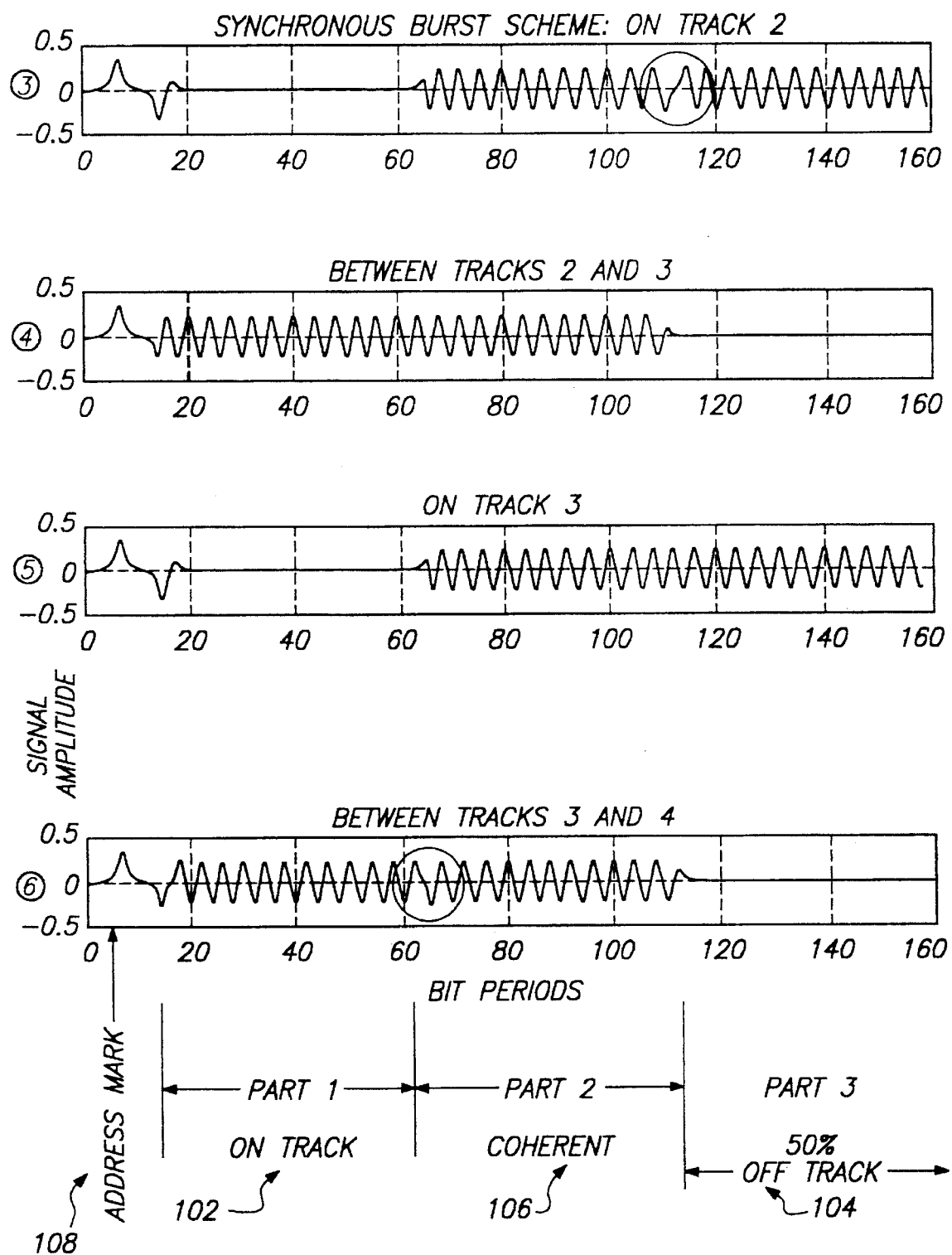
FIG. 2 represents a series of graphs of analog electrical waveforms induced in a data transducer head at selected radial head positions relative to the FIG. 1A magnetization pattern.

FIG. 1A depicts a new servo burst pattern in accordance with principles of the present invention from a perspective of recorded one-half track width magnetization patterns, wherein a plus symbol denotes e.g. recorded magnetic domains of a first polarity (e.g. N–S) and wherein a minus symbol denotes recorded magnetic domains of an opposite polarity (e.g. S–N) within a longitudinal recording pattern. The servo address mark and track number patterns are not shown in the FIG. 1A example, however, the servo address mark field 108 is shown in FIG. 2. In the present example, three phases of the fine position servo burst portion 100 are preferred and therefore illustrated. These phases include an on-track phase 102, a 50% off-track phase 104 and a coherent phase 106 between the on-track phase 102 and the 50% off-track phase which comprises a repeating phase-coherent magnetization pattern which does not vary from track to track with radial displacement of the head relative to the disk. The coherent phase 106 is provided to enable the synchronous sampling gain and timing loops to reset to precise timing phase and gain following the on-track phase 102, for recovery of the information in the 50% off-track phase 104.

In the case of the on-track phase 102 the magnetization pattern changes at the centerline of each track. Thus, in the on-track phase 102 the magnetization patterns are of opposite polarity. When the head 26 is following the centerline of a track, it nominally electrically subtends each half width pattern equally, and sums the opposite-phase patterns, resulting in zero amplitude position error signal (PES) samples (there may be a slight inequivalence in some magnetoresistive read response characteristics).

In the case of the 50% off-track phase 104, the magnetization patterns are of opposite polarity at the track boundary. If, for example, the head 26 is settling at a destination track location at the end of a track seeking operation, or the disk drive has sustained a bump or shock force which drives the head 26 off-track such that the head is now following a track boundary between adjacent tracks, rather than a track centerline, the head 26 will read a full amplitude from the on-track phase 102, and will realize servo samples representing a net zero amplitude output (PES=0) from the 50% off-track phase 104.

In the coherent phase 106, the magnetization patterns do not change along the disk radius (except as the data transfer rates change at zone boundaries as explained in the related U.S. Pat. No. 5,384,671, either at the centerline, or at the boundary, of each track. So, ideally, the coherent phase 106 provides a reference signal as may be useful in some PRML channels for updating of e.g. the timing, gain, and/or DC offset control loops.

The on-track phase 102, off-track phase 104 and coherent phase 106 may include full-cycle ¼T repetitions of the magnetization pattern shown in FIG. 1A to provide a desired number of sample values, so that each phase 102, 104 and 106 represents a separate "burst". Each of these phases represents a "concurrent burst" in that the two half-track-width sinewave portions of each phase are concurrently read. In the present example, each full cycle of the sinewave burst includes two positive samples and two negative samples or 4T samples. By synchronous sampling is meant that the digital samples are ideally taken at e.g. ±0.707 of the positive and negative peaks of each full cycle. For example, there may be 12 4T magnetization patterns (48 clock cycles or T cycles) for the on-track phase 102 and the off track phase 104; and there may be 4 4T magnetization patterns (16T cycles) of the coherent phase 106 (to restore timing phase and gain loop lock). Longer or shorter phases may be employed, depending upon system tolerances and control loop lock characteristics. Also, other sinewave periodicities may be employed, such as 6T, 8T, etc.

Figure 3:
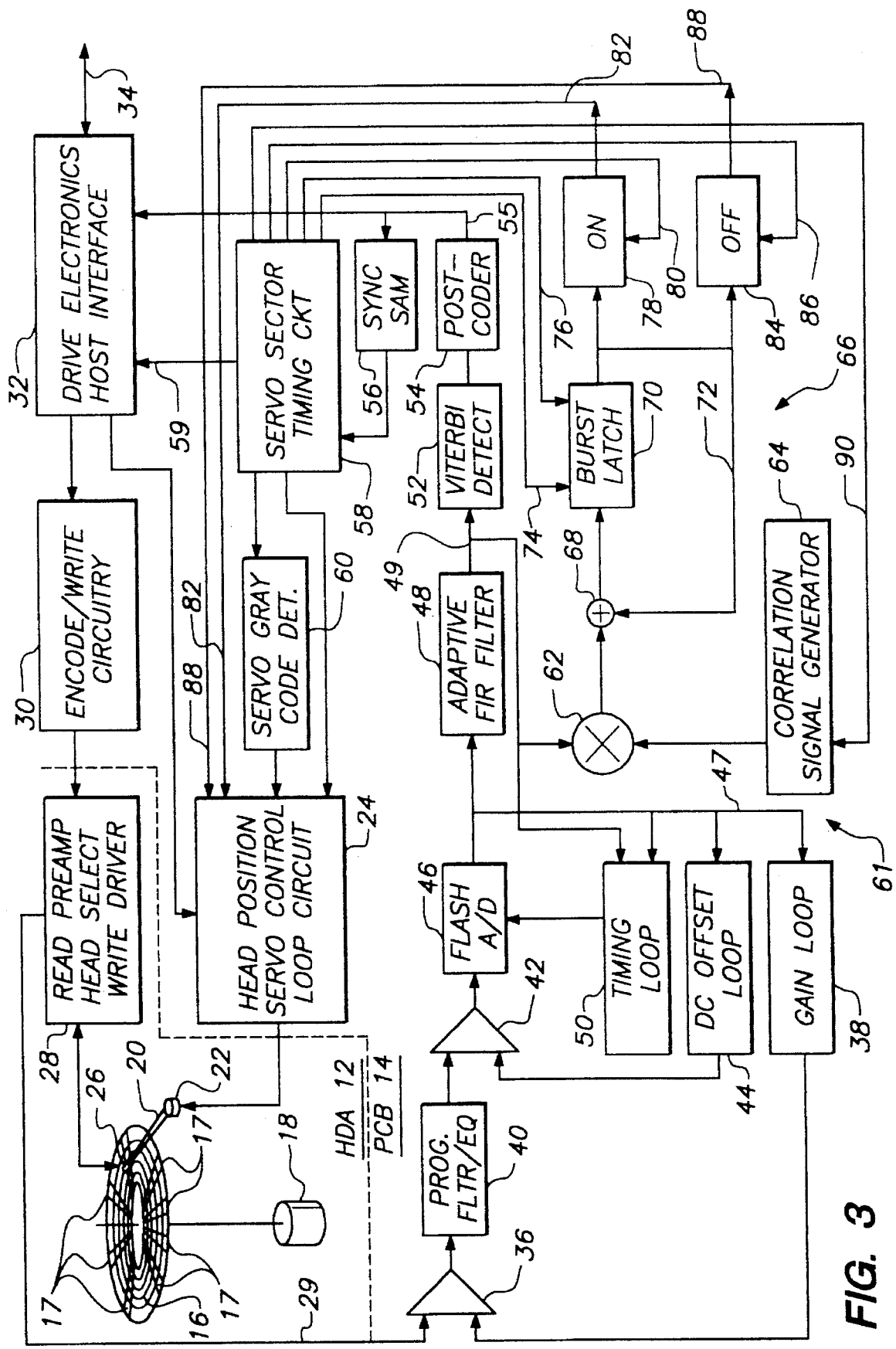
FIG. 3 is a block diagram of a PRML data channel within a hard disk drive including a synchronous servo burst detection circuit and a correlator-integrator (discrete gated matched filter) for detecting the FIG. 1A magnetization pattern in accordance with principles of the present invention.

Thus, as shown in FIG. 1A, if a data transducer head, e.g. the thin film read/write head 26 of FIG. 3, is precisely following a track centerline, the magnetization patterns will cancel themselves out when the head passes over the on-track phase 102. During the coherent phase, the patterns will add together, irrespective of radial displacement of the head, and the patterns will also add together during the 50% off-track phase 104 for so long as the head follows each track centerline.

Fig. 1B illustrates the new servo burst pattern from the perspective of equalized partial response, class IV (PR4) samples, which are obtained when the head is centered either at track center, in head positions 1, 3 and 5, or at track boundaries as in head positions 2, 4, and 6, as illustrated in FIGS. 1A and 1B. In the FIG. 1B example, the "X" values denote boundary samples and do not in themselves yield usable PES information.

FIG. 1C illustrates graphically two cross-track PES profiles which are put out by a correlation-integration circuit (discrete sample matched filter), for the on-track phase 102 and for the 50% off-track phase 104. The correlation-integration circuit is explained below. Since the e.g. thin film inductive read/write head 26 has in the present example an effective electrical read-mode width e.g. of about two-thirds of one track width, each PES curve graphed in FIG. 1C includes peak amplitude saturation regions wherein amplitude remains invariant with change in radial head position. In the on-track phase 102, the saturation regions nominally occur at the track boundaries, and in the 50% off-track phase the saturation regions nominally occur at the track centerlines. Fortunately, when samples from on-track phase 102 represent peak-saturation, samples are obtained from the most linear region of the 50% off-track phase, and conversely so. In this sense the PES outputs from the on-track phase 102 and the 50% off-track phase 104 result in PES amplitude values closely analogous to the values realized and discussed in the referenced and commonly assigned U.S. Pat. No. 5,170,299. Also, by looking at the polarity of samples of the burst signal being read from the 50% off-track phase 104, it can be ascertained from this phase information whether an odd track or an even track centerline is being followed (odd and even being related to an absolute track numbering system before e.g. Gray coding thereof).

FIG. 2 provides yet another perspective from which to consider the FIG. 1A servo burst pattern. This perspective is the electrical analog signal waveform induced in the head 26 during passage over the servo sector 100. In FIG. 2, a synchronous servo address mark field 108 is shown immediately preceding the on-track phase 102, coherent phase 106 and 50% offset phase 104 in the sense of relative motion between the head 26 and an underlying, rotating data storage disk, such as the disk 16 shown in FIG. 3. In several locations which are marked by circles in FIG. 1A and in FIG. 2, the magnetic dipole patterns are arranged in like-pole confrontation. This like polar confrontation of magnetic domains marked in the magnetic patterns graphed in FIG. 1A results in phase discontinuities in the recovered analog electrical signal, as shown in the also-marked portions of the FIG. 2 waveforms.

Given the fact that the head 26 manifests an effective electrical width of about two-thirds track width, the FIG. 2 scheme employing an on-track phase and a 50% off-track phase is adequate to enable the head 26 accurately to resolve head position for proper performance of the head position servo loop.

With reference to FIG. 3, an exemplary high performance, high data capacity, low cost disk drive 10 incorporating a programmable and adaptive PRML write/read channel with synchronous servo burst field detection in accordance with the principles of the present invention includes e.g. a head and disk assembly ("HDA") 12 and at least one electronics circuit board (PCB) 14 connected to the HDA 12. The HDA 12 includes a base including a spindle assembly to which one or more disks 16 are mounted in a stacked relationship. A spindle motor 18 rotates the spindle and disk stack at a predetermined rotational velocity. A head stack assembly 20 forming a rotary actuator mounted to the base positions each data head 26 relative to a corresponding data storage surface. A rotary voice coil motor 22 rotates the head stack 20 to position the heads 26. The HDA 12 may follow a wide variety of embodiments and sizes. One example of a suitable HDA is given in commonly assigned U.S. Pat. No. 5,027,241. Another suitable HDA is described in commonly assigned U.S. Pat. No. 4,669,004. Yet another suitable HDA is described in commonly assigned U.S. Pat. No. 5,084,791. Yet another HDA arrangement is illustrated in commonly assigned, copending U.S. Pat. No. 5,255,136. The disclosures of these patents and this application are incorporated herein by reference thereto.

A head select/read channel preamplifier 28 is preferably included within the HDA 12 in close proximity to the thin film heads 26 to reduce noise pickup. As is conventional, the preamplifier 28 is preferably mounted to, and connected by, a thin flexible plastic printed circuit substrate. A portion of the flexible plastic substrate extends exteriorly of the HDA 12 to provide electrical signal connections with the circuitry carried on the PCB 14.

The electronics PCB 14 physically supports and electrically connects the disk drive electronic circuitry needed for an intelligent interface disk drive subsystem, such as the drive 10. The electronics circuitry contained on the PCB 14 includes encode/write circuitry 30, drive electronics including a host interface 32 and a disk drive-host bus structure 34 over which commands and data are passed from the host, and status and data are passed from the disk. The drive electronics 32 includes e.g. a sequencer, an ENDEC/SERDES, ECC circuitry, a precoder, a cache buffer controller, a cache buffer memory array, a high level interface controller implementing a bus level interface structure, such as SCSI II target, for communications over a bus 21 with a SCSI II host initiator adapter within a host computing machine (not shown). An embedded, programmed digital microcontroller controls data formatting and data transfer operations of the sequencer, data block transfer activities of the interface, head positioning of the rotary actuator structure 20 via a servo loop including the head 26, the preamplifier 28 and synchronous data channel (in a manner explained hereinafter), and a head position servo control loop circuit 24. The microcontroller also controls the spindle motor 18 via a suitable motor control/driver circuit. These elements are not a part of the present invention and are not described in any detail herein.

The channel of FIG. 3 may conventionally include the read preamplifier 28, a data path 29 leading to a first variable gain amplifier 36 for controlling gain of the analog signal stream on the path 29, an analog programmable filter/equalizer 40 which functions to shape the spectrum of the analog signal stream desirably to a partial response spectrum, an analog adder 42 which is used to control DC offset, a flash analog to digital converter 46, a digital adaptive finite impulse response filter 48, a Viterbi detector 52, and a postcoder 54. A dual mode gain control loop 38, and a dual mode timing loop 50 also provide important functions within the synchronous data channel. All of these elements together comprise a highly efficient, and presently preferred synchronous PRML data channel of a type described in the referenced, commonly assigned, copending U.S. patent application Ser. No. 07/937,064 entitled "Disk Drive Using PRML Class IV Sampling Data Detection with Digital Adaptive Equalization", now U.S. Pat. No. 5,341,249, the disclosure thereof being incorporated herein by reference. The DC offset control circuit 44 receives unconditioned data samples from the output of the flash A/D 46 and determines a DC offset correction value preferably in accordance with the teachings of commonly assigned, copending Ziperovich U.S. patent application Ser. No. 08/276,817 filed on Jul 18, 1994, entitled: "Real-Time DC Offset Control For PRML Sampled Digital Data Channel", now U.S. Pat. No 5,459, 679 the disclosure thereof being incorporated herein by reference. The digital DC offset correction values are converted to analog values by an offset DAC (not shown) and used to adjust the DC offset at the analog adder 42 in the analog data path between the filter/equalizer 40 and the flash A/D converter 46.

Alternatively, the synchronous data channel may be realized differently. In one different, yet entirely satisfactory approach, a sample and hold circuit receiving the incoming data stream from the head 26 may be followed by an analog magnitude FIR filter, followed by an amplitude digitizer, and then by a synchronous interleave detector and postcoder, etc.

In the synchronous data channel example illustrated in FIG. 3, magnetic flux transitions sensed by the selected data transducer head 26 during playback mode are preamplified as an analog signal stream by the read preamplifier circuit 28. These signals will resemble the analog waveforms graphed in FIG. 2 herein during passage of servo sector pattern 100 by the head 26 and depending on radial alignment of the head 26 with the particular data track being followed. The preamplified analog signal stream is then sent through the path 29 to the analog variable gain amplifier (VGA) 36. After controlled amplification, the analog signal stream is then passed through the programmable analog filter/equalizer stage 40. The analog filter/equalizer 40 is programmed so that it is optimized for the data transfer rate of a selected radial zone of data tracks from within which the transducer head 26 is reading data (the zones being arranged to optimize data transfer rate with disk radius in conventional fashion). The equalized analog read signal is then subjected to sampling and quantization within the high speed flash analog to digital (A/D) converter 46 which, when synchronized to user data, generates raw digital data samples $\{x_k\}$. The A/D 46 is provided with a suitable resolution, which is at least six bits, and more preferably, eight bits per sample $\{x_k\}$.

An FIR filter 48 is included for further filtering and conditioning the raw data samples $\{x_k\}$. The FIR filter 48 employs adaptive filter coefficients for filtering and conditioning the raw data samples $\{x_k\}$ in accordance e.g. with desired channel response characteristics (such as PR Class IV (PR4), EPR4 or $E^2$PR4) in order to produce filtered and conditioned samples $\{y_k\}$. Since the preamble comprises a sinewave pattern, it is not necessary to equalize to a PR4 response.

The filtered and conditioned data samples $\{y_k\}$ leaving the FIR filter 48 pass over the path 49 to the Viterbi detector 50 which decodes the data stream, based upon the Viterbi maximum likelihood algorithm employing a lattice pipeline structure implementing a trellis state decoder, for example. At this stage, the decoded data put out on a path 96 is passed through a postcoder 52 which restores the original binary data values.

Use of a digital gain control loop and a digital timing control loop has a number of advantages. First, a gain (and timing) control loop controlled via digital samples is less sensitive to variations in temperature, power supply and component tolerances than is a strictly analog control loop. Second, loop compensation or bandwidth may be easily adjusted or varied simply by loading registers, or by switching between banks of registers for "on the fly" changes. This means that optimal loop compensation may be used during both acquisition and tracking modes. Finally, the digital loop filter eliminates errors otherwise due to bias and offset that may exist in an analog-only loop filter implementation. In the present invention, ideally, the gain and timing control loops are able to be updated during passage over each coherent phase 106, so that there is no loss of gain or timing control between the on-track phase 102 and the 50% off-track phase 104.

Upon detection of each servo SAM in the field 108, a signal resynchronizes a sector interval timer within a servo sector timing circuit 58. Following detection of the SAM in the field 108, the timing circuit 58 marks in time the locations of the on-track phase 102, 50% off-track phase 104 and coherent phase 106, and provides timing and control signals to control a servo Gray code decoder circuit 60 and a synchronous servo burst amplitude detector circuit 61 in accordance with the present invention. Details of the SAM decoder 56, servo sector timing circuit 58 and servo Gray code detector 60 are given in the referenced U.S. patent application Ser. No. 08/174,895 referred to above.

Essentially, the synchronous servo burst detector 61 comprises a correlator-integrator circuit which manifests in discrete time the characteristics of a matched filter which has an impulse response which is the time inverse of the incoming signal. The detector 61 includes, in addition to the partial response channel, a multiplier 62 which multiplies filtered digital samples received via an output path 49 from the FIR filter 48 by values received from a correlation signal generator 64. The digital correlator multiplier signal is matched in frequency to the written burst signal. Referring to FIG. 1B, when a pattern of +2, +2, −2, −2, +2, +2 is being read, the correlation filter values put out by the correlation signal generator 64 are +1, +1, −1, −1, +1, +1, so that the product put out by the multiplier 62 is an amplitude value in which the sign has been selectively complemented. The relative phase of the correlator multiplier signal to the readback burst signal may be used to determine off-track direction. The correlation signal generator circuit 64 is reset following detection of SAM by a reset control signal passed from the servo sector timing circuit 58 via a control path 90.

The products put out by the multiplier 62 are selectively accumulated in a PES accumulator circuit 66. With the illustrated arrangement of a correlator generator 64, multiplier 62, and an accumulator 66, a discrete time domain matched filter is achieved which produces position samples in which output peak signal to noise values are maximized relative to a Gaussian noise distribution. In other words, when a multiplicity of samples having had their signs selectively complemented are accumulated by the accumulator 66, the resultant summation provides a very robust head fine position signal in which a noise component has been minimized.

The accumulator circuit 66 includes a summing circuit 68, a latch 70 and a feedback path 72 from an output of the latch 70 to the summing junction 68. The accumulator circuit 66 is cleared by a CLEAR signal on a path 74 and then enabled by an ENABLE BURST signal on a path 76 from the servo sector timing circuit 58. The ENABLE BURST control signal is asserted after several initial data samples of the on-track phase (denoted "X,X" in FIG. 1B) have passed by as to be operative during the balance of the on-track phase 102 to accumulate an on-track PES and provide the on-track PES to an on-track PES latch 78. The on-track PES latch 78 is enabled by an ENABLE ON-TRACK control on a path 80 from the servo sector timing circuit. The latched on-track PES is delivered to the head position servo control loop circuit 24 via a path 82. The initial samples denoted X,X in FIG. 1B are avoided because of potential phase discontinuities in the sinewave patterns at the boundaries of the phases 102, 104 and 106 which would result in asymmetrical sampling of the position samples (sample phase discontinuities). One advantage of the present discrete matched filter arrangement is that the correlation signal generator 64 and the accumulator circuit 66 may be selectively turned on during phases 102 and 104, and turned off during the coherent phase 106 without introduction of any unwanted artifacts or aliases which could accompany switching in and out of an analog matched filter, for example.

Responsive to the CLEAR control signal on the path 74 and to the ENABLE BURST control signal on the path 76, the accumulator circuit 66 is cleared and then enabled after several initial samples of the 50% off-track phase (also denoted "X,X" in FIG. 1B) have passed by as to be operative during the 50% off-track phase 104 to accumulate an off-track PES and provide the off-track PES to an off-track PES latch 84. The off-track PES latch 84 is enabled by an ENABLE OFF-TRACK control on a path 86 from servo sector timing circuit 58. Once enabled, the off-track PES latch 84 latches the 50% off-track PES value and supplies it to the head position servo control loop circuit 24 via an output path 88.

FIG. 1C graphs the on-track PES put out on the path 82, and graphs the 50% off-track PES put out on the path 88, as a function of radial head displacement relative to the concentric data tracks. As shown in FIG. 1C, the on-track PES is most linear at each track centerline, whereas the 50% off-track PES is most linear at each track boundary. The head position servo control loop circuit selects between the on-track PES and the 50% off-track PES for fine head position, depending upon which PES is in its linear range.

While in the FIG. 3 embodiment the multiplicand feeding the multiplier 62 is taken from the output of the FIR filter 48 via the path 49, it should be understood that the FIR filter 48 is optional for synchronous servo burst detection. It should be understood by those skilled in the art that as the burst comprises a sinewave pattern, equalization to a particular partial response spectrum response is not required. The filtering and equalization should be selected and applied in order to minimize distortion occurring at the transitions between DC erase zones and burst zones, for example. If the channel is not effectively equalized, when a transition from DC erase to the ¼T burst pattern is reached, resultant distortion will span multiple raw data samples taken in the transition region. If such distortion is present, the servo burst intervals must be extended, thereby unnecessarily and inefficiently extending the overhead areas at the expense of user data storage. The multiplicand could be provided by unconditioned data samples x{k} on the path 47 at the output of the flash analog to digital converter 46. However, since the FIR filter 18 is present, it makes good sense to use it for further filtering of the data samples.

Figures 4A, 4B, 4C:
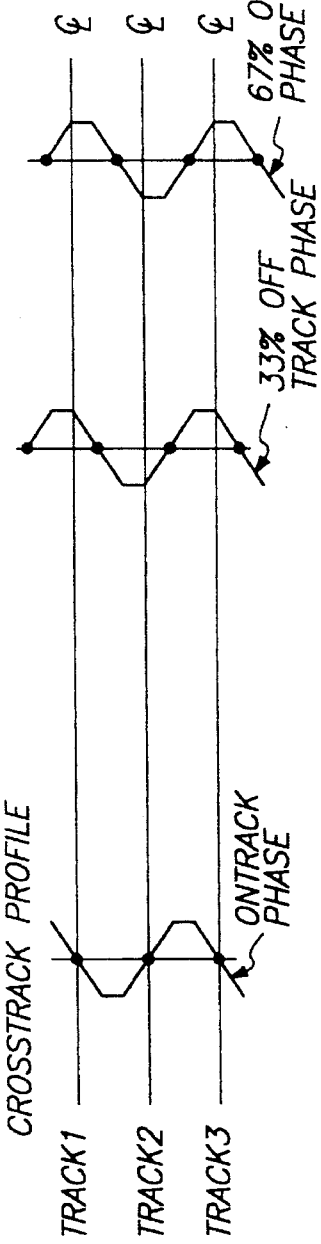
FIG. 4A represents an enlarged, lineal diagram of a magnetization pattern for a servo sector continuous PES field for use with write-wide read-narrow head transducer assemblies such as those having inductive thin film write elements and magnetoresistive read elements, in accordance with further aspects of the present invention.
FIG. 4B represents a graph of PR4 synchronous sample values derived from the FIG. 4A pattern.
FIG. 4C represents a graph of cross-track position profiles put out by a correlator filter circuit, showing on-track, 33% off-track, and 67% off-track phase signals as a function of head-track position.

FIGS. 4A, 4B and 4C illustrate a servo burst pattern which is adapted to head structures which have electrical widths which are effectively less than e.g. about two-thirds of a track width, as is frequently the case with write-wide/read-narrow thin film inductive write-magnetoresistive read data transducer heads. When a narrower electrical read width is present, the peak amplitude saturation region for each pattern is extended, and the linear region is reduced. In this example, servo patterns may be written in one-third track widths, so that there are e.g. three patterns within the width of each data track, measured from centerline to centerline. In this pattern an on-track phase 112 and a coherent phase 114 are followed by a 33% off-track phase 116 and a 67% off-track phase 118. FIG. 1B shows the synchronous data samples. The on-track phase provides a linear PES signal for 33% of the track width from track centerline. The next 33% of the track width is covered by the 33% off-track phase 116, and the final 33% is provided by the 67% off-track phase, with some overlap of the linear ranges of each phase, as shown in FIG. 4C, as determined by the effective electrical read width of the data transducer head. In order to implement this particular approach, the detector circuit 61 of FIG. 3 includes an additional accumulator circuit, and the timing circuit 58 provides three sequential reset and accumulation enable control signals to control operations of the three accumulators.

Figure 5:
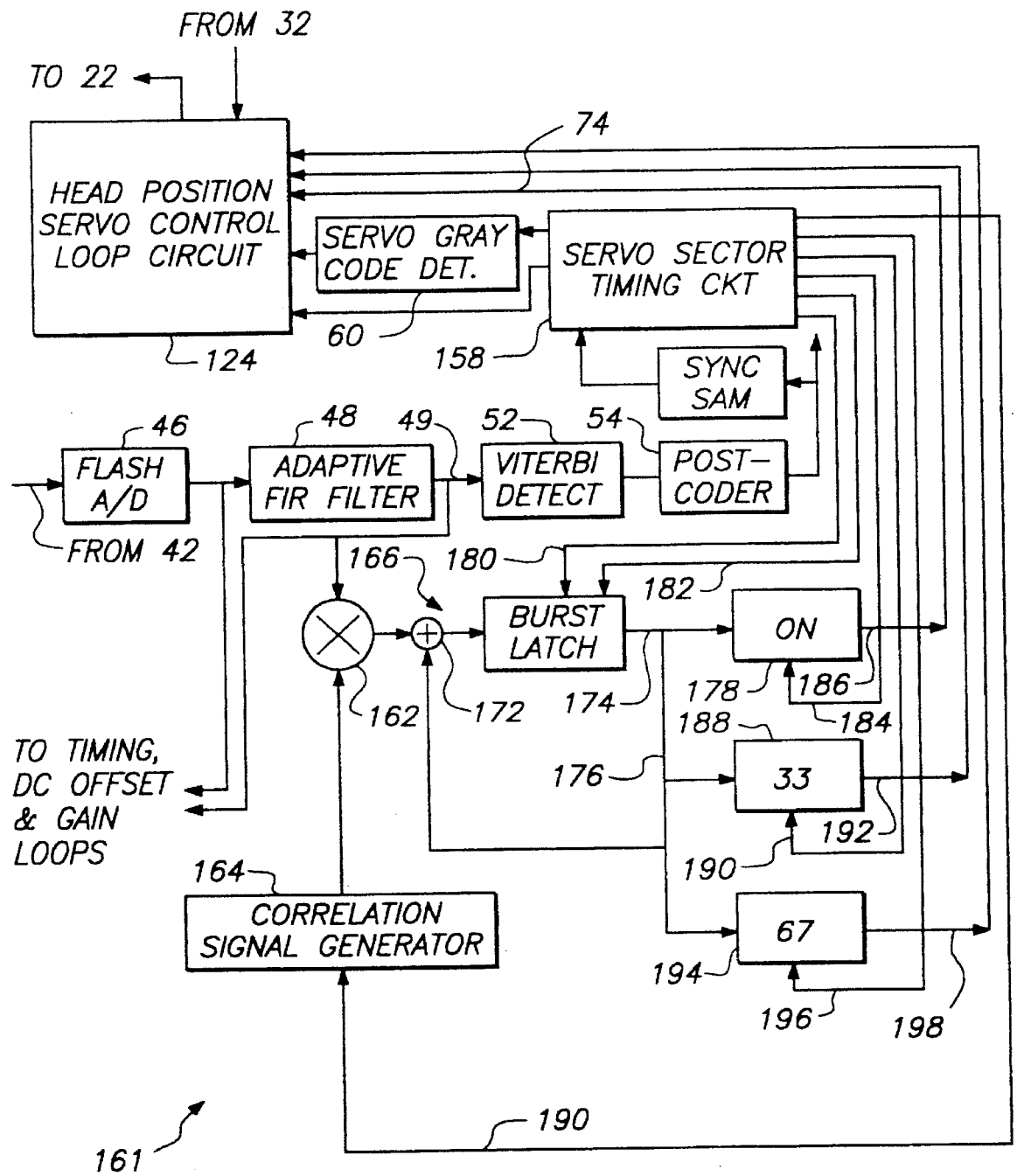
FIG. 5 is a partial block diagram of a PRML data channel within a hard disk drive including a synchronous servo burst detection circuit and a correlator-integrator for detecting the three-phase magnetization pattern illustrated in FIG. 4A.

FIG. 5 illustrates a synchronous servo burst detection circuit 161 which has been adapted to detect the FIG. 4A pattern. The servo burst matched filter detection circuit 161 is particularly useful when a write wide/read narrow head structure is employed in which the effective electrical width of the read element is less than two-thirds of the track width or track width. Accordingly, the FIG. 5 embodiment is particularly useful within disk drives employing inductive write/magnetoresistive read head transducer assemblies, for example. In the FIG. 5 example circuit elements which are unchanged from the FIG. 3 embodiment bear the same reference numerals, and other unchanged elements are omitted from the discussion of FIG. 5. The explanation given above for the same elements applies with equal force to the FIG. 5 example.

In the modified discrete matched filter detector 161, a multiplier 162 multiplies the filtered digital samples taken from the FIG. 4A pattern by values received from a correlation signal generator 164, as previously explained above for the FIG. 3 example. The correlation signal generator 164 is reset following detection of SAM by a reset control signal passed from the servo sector timing circuit 158 via a control path 190.

The products put out by the multiplier 162 are sequentially accumulated in a PES accumulator circuit 166. The accumulator circuit 166 is active during receipt of the samples from the on-track phase 112 of FIG. 4A and includes a summing circuit 172, a latch 174 and a feedback path 176 which feeds the output of the latch 174 back into the summing circuit 172 and which also provides an on-track phase PES to an on-track PES latch 178. The latch 174 is cleared by a CLEAR control signal supplied via a path 180 from the servo sector timing circuit 158. The on-track PES latch 178 is enabled by an ON-TRACK ENABLE control supplied over a path 184 from the servo sector timing circuit 158. An output path 186 supplies the on-track PES signal to the head position servo control loop circuit 124.

After being cleared, the accumulator circuit 166 then accumulates samples from the 33% off-track phase 116 of FIG. 4A. A 33% off-track PES signal is then transferred to a 33% off-track PES latch 188 which is enabled by a 33% OFF-TRACK ENABLE control supplied over a path 190 from the servo sector timing circuit 158. The accumulated 33% off-track PES in the latch 188 is then supplied over an output path 192 to the head position servo control loop circuit 124. Then the accumulator latch 174 is disenabled by deassertion of the ENABLE BURST control on the path 182, and again cleared by the CLEAR signal asserted over the control path 180.

During receipt of the samples from the 67% off-track phase 116 of FIG. 4A, the accumulator circuit 166 is again enabled by assertion of the ENABLE BURST control over the path 182, and accumulates the samples from the 67% off-track phase. A resultant 67% off-track PES is then supplied to a 67% off-track PES latch 194 which is enabled by a 67% OFF-TRACK ENABLE control signal supplied via a path 196 from the servo sector timing circuit 158. An output path 198 from the 67% off-track PES latch 194 provides a 67% off-track phase PES to the head position servo control loop circuit 124.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method for synchronously detecting fine head position information recorded within an embedded servo sector within a track defined on a moving magnetic storage medium as a first plurality of longitudinal sinewave phase coherent patterns in phase opposition along a first longitudinal boundary and a second plurality of longitudinal sinewave phase coherent patterns in phase opposition along a second longitudinal boundary and separated from the first plurality by a phase coherent reference pattern within the track, the first and second longitudinal boundaries being located in relation to a centerline of the track, the synchronous detection being accomplished with a magnetic read head having an effective electrical width less than a nominal width of the track and a partial response maximum likelihood sampling data detection channel, wherein the patterns are recorded at a rate manifesting intersymbol interference within the sampling data detection channel, the method comprising the steps of:

establishing initial timing and gain control conditions within the sampling data detection channel, reading the first plurality of phase coherent patterns with the magnetic read head to produce a first analog servo signal stream, reading the phase coherent reference pattern to produce a reference analog signal stream, reading the second plurality of phase coherent patterns with the magnetic read head to produce a second analog servo signal stream, analog filtering the first and second analog servo signal streams with an analog filter within the sampling data detection channel to produce a pair of filtered analog signal stream sequences, synchronously quantizing the first analog signal stream sequence to provide first synchronous digital burst samples along the first longitudinal boundary, synchronously quantizing the reference analog signal stream to provide reference synchronous digital burst samples, synchronously quantizing the second analog signal stream sequence to provide second synchronous digital burst samples along the second longitudinal boundary, filtering the first and second synchronous digital burst samples within a matched filter to maximize output peak signal to noise to produce filtered fine head position values relative to track centerline, providing the filtered fine head position values to a head positioner circuit for positioning the magnetic read head relative to track centerline, and using the filtered reference samples to update the timing and gain control conditions within the sampling data detection channel before the second plurality of phase coherent patterns are read.

2. The method set forth in claim 1 wherein the step of filtering the first and second synchronous digital burst samples within a matched filter comprises the steps of:

multiplying the first, reference and second synchronous digital burst samples by a normalization factor generated by a correlation signal generator to provide normalized samples, integrating the normalized samples within an integrator to produce the fine head position values, and holding the fine position values in a plurality of latches for use by the head positioner circuit.

3. The method set forth in claim 1 wherein the embedded servo sector includes at least a timing synchronization field preceding the phase coherent burst patterns and wherein the step of establishing initial timing and gain control conditions within the sampling data detection channel includes the further step of phase locking a quantization timing loop of the sampling data detection channel in synchronism with the synchronization field.

4. The method set forth in claim 1 wherein magnetic read head has an effective electrical read width at least about two-thirds of a width of the data track, and wherein the longitudinal boundary of the first longitudinal boundary. is coincident with the centerline of the data track.

5. The method set forth in claim 1 wherein the magnetic read head has an effective electrical read width less than about two-thirds of a width of the data track, wherein the first longitudinal boundary of the is coincident with the centerline of the data track, wherein the second longitudinal boundary is offset from the centerline of the data track by a first fractional track width amount and further comprising a third plurality of longitudinal sinewave phase coherent patterns in phase opposition along a third longitudinal boundary and separated from the second plurality by a second phase coherent reference pattern within the track, and comprising the further steps of:

reading the third plurality of phase coherent patterns with the magnetic read head to produce a third analog servo signal stream, analog filtering the first, second and third analog servo signal streams with the analog filter within the sampling data detection channel to produce a series of filtered analog signal stream sequences, synchronously quantizing the third analog signal stream sequence to provide third synchronous digital burst samples along the third longitudinal boundary, filtering the third synchronous digital burst samples within a matched filter to maximize output peak signal to noise to produce a filtered third fine head position value relative to track centerline, and providing the filtered third fine head position value to a head positioner circuit for fine positioning the magnetic read head relative to track centerline.

6. A method for synchronously detecting fine position servo burst information with a data transducer having an electrical width not less than about two-thirds a width of a data track within a partial response maximum likelihood data channel wherein the servo burst information is recorded as a concurrent burst pattern of two half-track-width phase coherent sinewaves within each one of a multiplicity of concentric data tracks of a disk, each pattern including an on-track phase for generating a position error signal which varies approximately linearly with head displacement about track centerline and an off-track phase generating a position error signal which varies approximately linearly with head displacement about track boundary, comprising the steps of:

reading the on-track phase and the off-track phase with a head to provide an analog signal stream, amplifying and low pass filtering the signal stream, to normalize gain of the signal stream, synchronously quantizing the signal stream to provide synchronous digital burst samples, multiplying the synchronous digital burst samples during servo sampling intervals by a normalization factor generated by a correlation signal generator to provide normalized samples, integrating normalized samples originating during the on-track phase to provide an on-track position error signal and holding the on-track position error signal, integrating normalized samples originating during the off-track phase to provide an off-track position error signal and holding the off-track position error signal and reading and quantizing a coherent phase pattern in the data track following the on-track phase and preceding the off-track phase to produce reference burst samples and using the reference burst samples for updating a timing control loop within the partial response maximum likelihood data channel before synchronously quantizing a portion of the signal stream corresponding to the off-track phase.

7. The method set forth in claim 6 comprising the further step of equalizing the synchronous digital burst samples before the multiplying step is carried out.

8. The method set forth in claim 6 wherein the step of amplifying and low pass filtering the signal stream includes the step of normalizing gain of the signal stream with a gain control loop responsive to the synchronous digital burst samples.

9. The method set forth in claim 6 wherein the step of synchronously quantizing the signal stream includes the step of controlling an analog to digital converter with the timing control loop responsive to the synchronous digital burst samples.

10. The method set forth in claim 6 wherein the servo burst information is recorded as phase coherent half track width patterns bounded by longitudinal signal null positions located in relation to track centerline.

11. The method set forth in claim 6 comprising the further steps of updating gain normalization of the signal stream with a gain control loop within the partial response maximum likelihood data channel and responsive to the synchronous digital burst samples taken from the coherent phase.

12. The method set forth in claim, 6 comprising the further step of providing a servo address mark within a servo sector and preceding in time the servo burst information, detecting the servo address mark and thereupon resetting a servo sector timing circuit within the partial response maximum likelihood data channel, and controlling integration timing of the integration steps with the servo sector timing circuit.

13. A method for synchronously detecting fine position servo burst information with a data transducer having an electrical width less than about two-thirds width of a data track within a partial response maximum likelihood data channel wherein the servo burst information is recorded as phase coherent sinewave, one-third track width patterns bounded between track centerline within each one of a multiplicity of concentric data tracks of a disk, each pattern including an on-track phase generating a position error signal which varies approximately linearly with head displacement about track centerline, a 33% off-track phase generating a position error signal which varies approximately linearly with head displacement about a location one third track width displaced from track centerline, a 67% off-track phase generating a position error signal which varies approximately linearly with head displacement about a location two thirds track width displaced from track centerline, and a coherent reference phase separating the on-track phase from an adjacent one of the 33% off-track phase, the 33% off-track phase and the 67% off-track phase, comprising the steps of:

reading the on-track phase, the 33% off-track phase, the 67% off-track phase and the coherent reference phase with a head to provide an analog signal stream, amplifying and low pass filtering the signal stream to normalize gain of the signal stream, synchronously quantizing the signal stream with synchronous quantization means to provide synchronous digital burst samples, multiplying the synchronous digital burst samples from the on-track phase, 33% off-track phase and the 67% off-track phase during servo sampling intervals by a normalization factor generated by a correlation signal generator to provide normalized samples, integrating normalized samples originating during the on-track phase to provide an on-track position error signal and holding the on-track position error signal, using the digital burst samples from the reference phase to update synchronization of the synchronous quantization means before synchronously quantizing portions of the signal stream representing the adjacent one of the 33% off-track phase and the 67% off-track phase, integrating normalized samples originating during the 33% off-track phase to provide a 33% off-track position error signal and holding the 33% off-track position error signal, and integrating normalized samples originating during the 67% off-track phase to provide a 67% off-track position error Signal and holding the 67% off-track position error signal.

14. The method set forth in claim 13 wherein the step of reading the on-track phase, the 33% off-track phase, the 67% off-track phase, and the reference phase is carried out with a magnetoresistive read head.

15. The method set forth in claim 13 comprising the further step of equalizing the synchronous digital burst samples taken from the on-track phase, 33% off-track phase and 67% off-track phase before the multiplying step is carried out.

16. A synchronous servo burst detector for detecting a phase-coherent sinewave servo burst pattern for a head position servo loop for controlling radial position of a data transducer head relative to a moving media defining a multiplicity of adjacent data storage tracks within a partial response, maximum likelihood recording and playback channel, the pattern being recorded on the media in fractional track widths and including in a sequence an on-track portion generating a position error signal which varies approximately linearly with head displacement about a centerline of each track an off-track portion generating a position error signal which varies approximately linearly with head displacement about a location offset from track centerline and related to a boundary between adjacent tracks, the off-track portion being separated from the on- track portion by a coherent reference phase portion, the detector comprising:

the transducer head for reading the servo burst pattern as an analog electrical signal stream, an analog read channel for amplifying the analog electrical signal stream, a low pass filter for low pass filtering the analog electrical signal stream, an analog to digital converter for synchronously sampling the filtered analog electrical signal stream and for putting out synchronous raw data samples, the analog to digital converter controlled by a timing control loop responsive to synchronous raw data samples from at least the coherent reference phase portion for generating quantization timing control values for controlling synchronous quantization of the analog electrical signal stream during at least reading of the off-track portion, a matched filter for filtering the synchronous raw data samples from the on-track portion and for filtering the synchronous raw data samples from the off-track portion, an on-track position error signal latch for holding the on-track position error signal and for supplying it to the head positioner servo loop, and at least one off-track position error signal latch for holding the off-track position error signal and for supplying it to the head positioner servo loop.

17. The synchronous servo burst detector set forth in claim 16 wherein the matched filter comprises:

a correlation signal generator for generating a sequence of synchronous digital correlation values, a multiplier for multiplying each synchronous raw data sample by a corresponding digital correlation value to produce a normalized quantization sample, and a digital integrator connected to integrate a sequence of normalized quantization samples obtained from the on-track portion to provide an on-track position error signal, and connected to integrate a sequence of the normalized quantization samples obtained from the off-track portion to provide at least one off-track position error signal.

18. The synchronous servo burst detector set forth in claim 16 further comprising a servo address mark pattern recorded in a servo area of the media adjacently before the servo burst pattern and a servo address mark pattern detector for detecting the servo address mark, and a servo timing circuit including an internal servo area timer which is reset upon detection of the servo address mark pattern for timing increments including the on-track portion and the off-track portion, and for resetting and enabling the digital integrator and the on-track position error signal latch and the off-track position error signal latch, and for resetting the correlation signal generator.

19. The synchronous servo burst detector set forth in claim 16 wherein the analog read channel includes a first variable gain amplifier .and a gain control loop responsive to synchronous raw data samples for generating gain control values for controlling gain of the first variable gain amplifier.

20. The synchronous servo burst detector set forth in claim 16 wherein the analog read channel includes a second variable gain amplifier and a DC offset control loop responsive to synchronous raw data samples for generating DC offset control values for controlling DC offset of the filtered analog electrical signal stream immediately before it is synchronously quantized by the analog to digital converter.

21. The synchronous servo burst detector set forth in claim 16 wherein the moving media comprises a magnetic data storage disk, and the multiplicity of tracks are defined to be concentric with an axis of rotation of the disk.

22. The synchronous servo burst detector set forth in claim 21 wherein the phase coherent servo burst pattern is included within each one of a plurality of circumferentially spaced-apart servo sectors embedded within the concentric data tracks.

23. The synchronous servo burst detector set forth in claim 16 further comprising a digital FIR filter connected between the digital to analog converter and the multiplier, the digital FIR filter for equalizing the synchronous raw data samples in accordance with a predetermined equalization characteristic.

24. The synchronous servo burst detector set forth in claim 16 wherein the phase coherent sinewave servo burst pattern is recorded on the media in a plurality of fractional track widths and includes at least three fractional width burst patterns bounded between track centerline within each one of a multiplicity of concentric data tracks of a disk, each pattern of a data track being phase coherent with data recorded in the data track and including an on-track portion generating a position error signal which is linear about track centerline, a first fractional off-track portion generating a position error signal which is linear about a location a first fractional track width displaced from track centerline, and a second fractional off-track portion generating a position error signal which is linear about a location a second fractional track width displaced from track centerline, the digital integrator connected to integrate a sequence of normalized quantization samples obtained from the on-track portion to provide the on-track position error signal, connected to integrate a sequence of the normalized quantization samples obtained from the first fractional off-track portion to provide a first fractional portion off-track position error signal, and connected to integrate a sequence of the normalized quantization samples obtained from the second fractional off-track portion to provide a second fractional portion off-track position error signal, wherein the at least one off-track position error signal latch holds the first fractional portion off-track position error signal, and further comprising a second fractional portion off-track position error signal latch for holding the second fractional portion off-track position error signal and for supplying it to the head positioner servo loop.

25. The synchronous servo burst detector set forth in claim 24 wherein the first fractional off-track portion is recorded at a 33% off-track width, and wherein the second fractional off-track portion is recorded at a 67% off-track width.

\* \* \* \* \*